No. 738,688. PATENTED SEPT. 8, 1903.
H. KRANTZ.
FLOOR BOX.
APPLICATION FILED MAY 14, 1903.
NO MODEL. 2 SHEETS—SHEET 1.
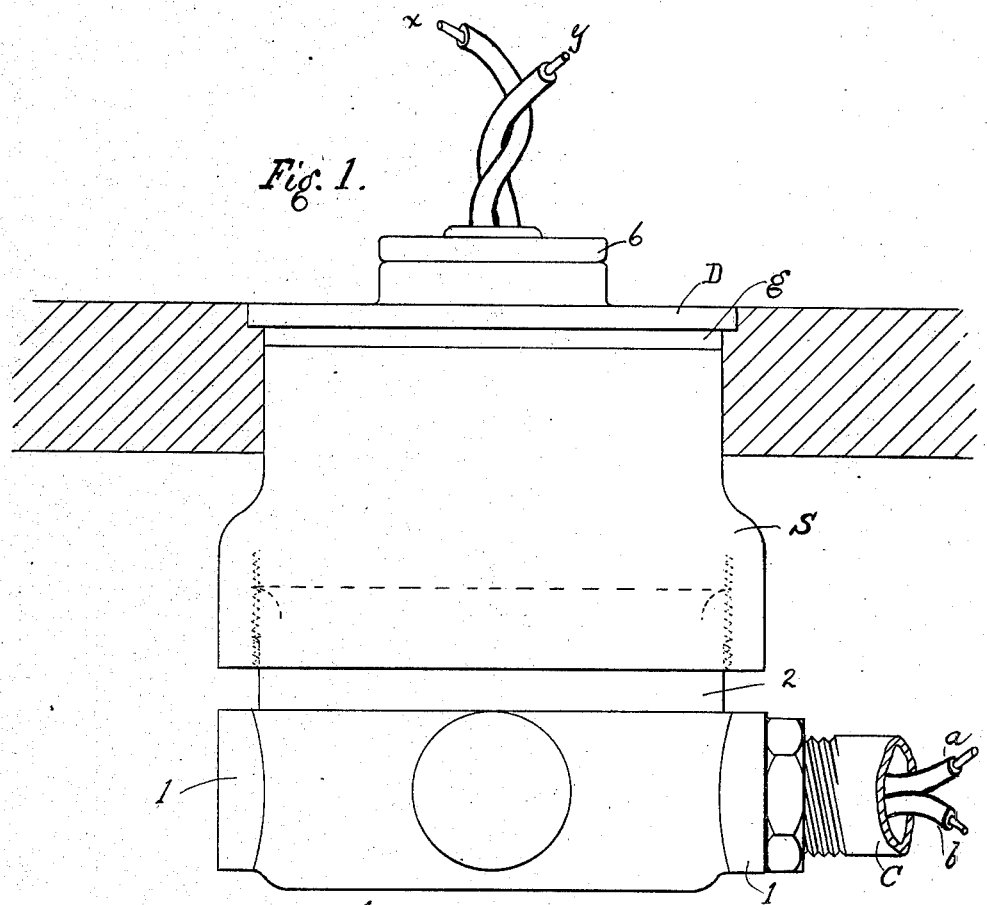
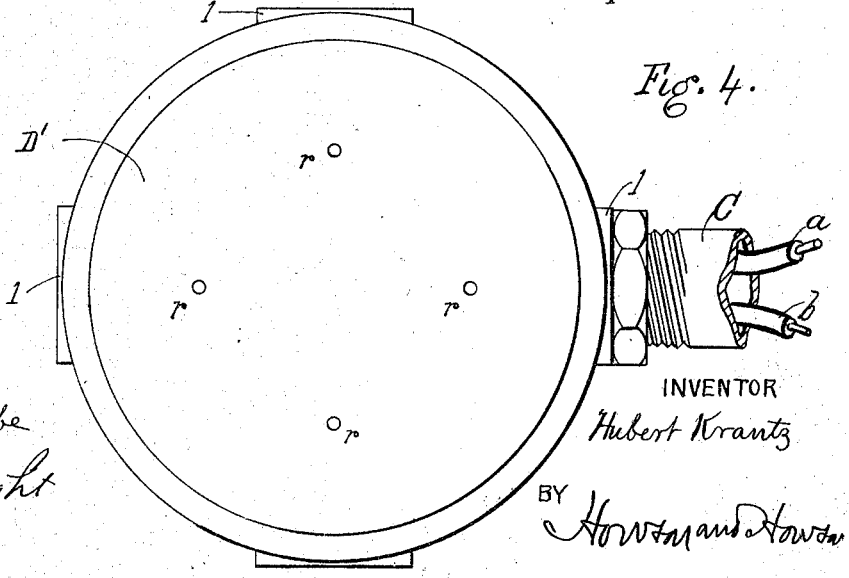
WITNESSES
Walter Abbe
F. W. Wright
INVENTOR
Hubert Krantz
BY
Howson and Howson
ATTORNEYS

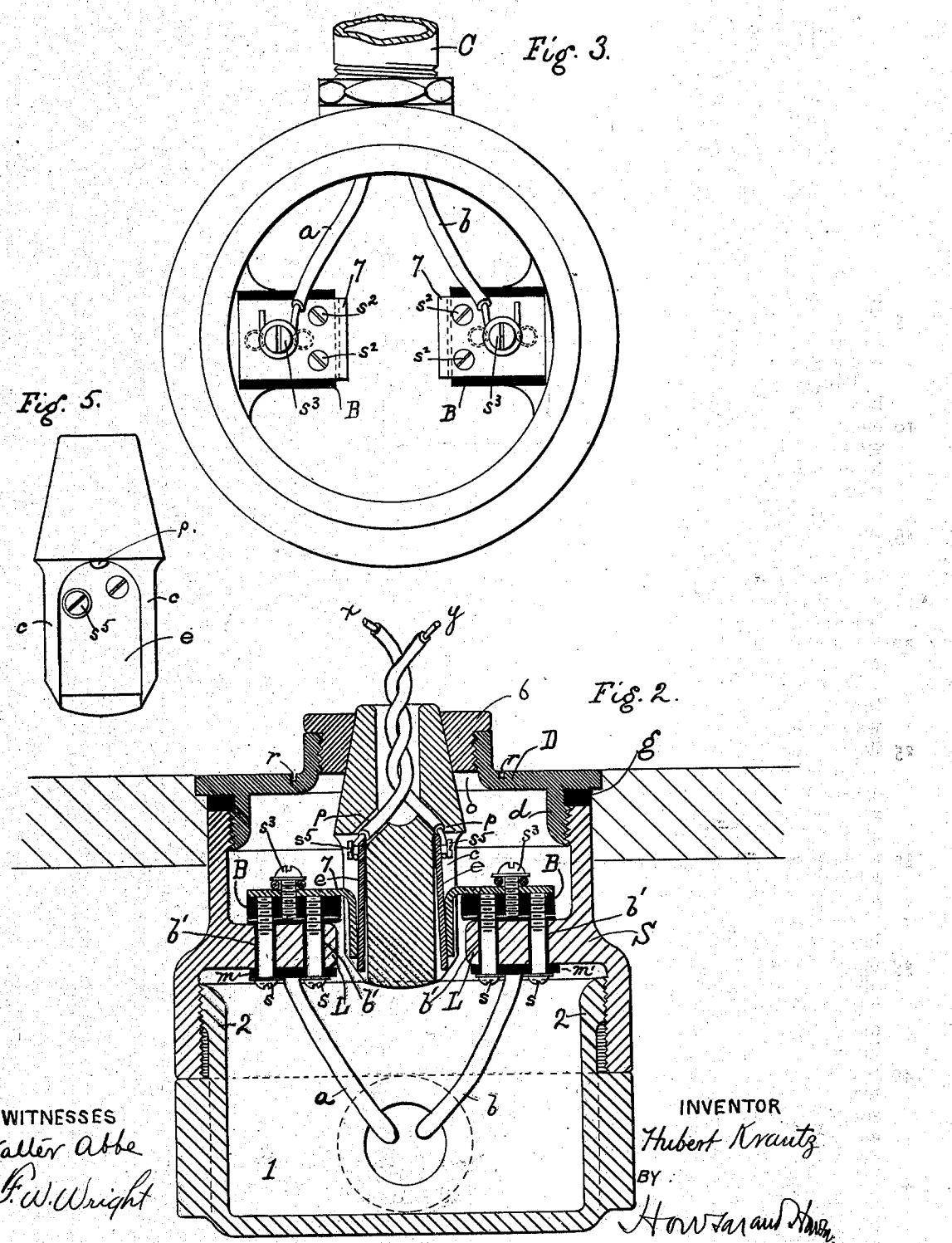

No. 738,688.

Patented September 8, 1903.

UNITED STATES PATENT OFFICE.

HUBERT KRANTZ, OF BROOKLYN, NEW YORK.

FLOOR-BOX.

SPECIFICATION forming part of Letters Patent No. 738,688, dated September 8, 1903.

Application filed May 14, 1903. Serial No. 157,105. (No model.)

*To all whom it may concern:*

Be it known that I, HUBERT KRANTZ, a citizen of the United States of America, residing in the borough of Brooklyn, in the county of Kings, State of New York, have invented an Improved Floor-Box, of which the following is a specification.

This invention relates to an improved floor-box into which the main conductors of an electric circuit enter from conduits and in which means are provided for attaching wires to supply current for lamps, motors, or the like.

The object of the invention is to improve the construction of such floor-boxes, to provide a ready means of adjustment of the cover-plate to the plane of the floor even though the conduits be of different levels where they enter different boxes, to so construct the box that the contact-plates therein cannot be short-circuited by moisture or dirt collecting within, and to make the box practically water-tight and protected from the entrance of water which may be used in scrubbing the floor in which the box may be set.

In the accompanying drawings, Figure 1 is a side elevation of a box set in a floor. Fig. 2 is a sectional side elevation. Fig. 3 is a plan of the box with the cover removed. Fig. 4 is a plan of the box with a closing-cover for use when the box is out of service, and Fig. 5 is a side elevation of a detachable plug.

The floor-box consists of a standard outlet-box part 1, having threaded or other suitable openings in its side wall for the connection of the conduit-pipes C, carrying the main wires $a\ b$. The outlet-box 1 has an upwardly-extending and externally-threaded rim 2 and is open at the top. A contact-carrying sleeve S is threaded, preferably internally, at both top and bottom. At the bottom the sleeve screws onto the threaded rim 2 of the box 1 as far as the depth of the outlet-box from the floor-level may require.

To the top of the box a cover D, having a depending threaded flange $d$, is secured, with an interposed gasket $g$, and this cover is screwed into the upper end of the sleeve S to bring the surface of the cover level with the surface of the flooring. This floor has a central threaded opening $o$, into which a flanged bushing 6, having a tapered central opening, may be screwed. This is a service-cover. When the box is to be out of service, the cover D is replaced by a flat-top cover D', Fig. 4. Both covers may be provided with recesses $r\ r$ for a key by which they may be screwed into or out of the sleeve. In the sleeve S, diametrically opposite, are two horizontal lugs L L, projecting inwardly and bored with holes, through which screws $s\ s$ are fitted to hold insulating-blocks B B securely on the upper surfaces of the lugs. Pieces of insulating material $m\ m'$ may protect the ends of the screws from contact with the lugs, while bushings $b'\ b'$ may insulate their shanks. To the insulating-block B an L-shaped contact-blade 7 is secured by small screws $s^2\ s^2$, while a binding-screw $s^3$ and washer serve to connect the line-wires $a\ b$ each with its individual contact-blade. The turned-over parts of the blades 7 project downwardly between the lugs. A detachable cylindrical plug having a tapered surface at its upper end corresponding to the taper of the bushing 6 is centrally bored for a distance from its top, terminating in passages $p\ p$ for the wires $x\ y$, which are to lead to the lamp or the like. Each passage $p$ opens into the top of a recessed chamber $c$ in the side of the plug, in which a contact-plate $e$ is secured. A binding-screw $s^5$ and washer serve to connect the wires with the plate $e$. By inserting this plug with the surface of the plates $e\ e$ in line with the blades 7 7 down into the box through the opening $o$ contact will be immediately established between the blades and plates, and by then screwing the bushing down onto the tapered plug a tight fit will be secured, effectively closing the box. By leaving a space between the contact-blades, which are well above the bottom of the box, I prevent all danger of short-circuit by collecting of dust or moisture. By making the floor-box in two parts—namely, the sleeve part and outlet-box part—threaded onto each other, I am enabled to first approximately locate the outlet-box and then accurately fit the sleeve to the level of the floor by turning it more or less on its threads. When this has been done, the wires

*a b* are secured to the binding-screws *s*³, and when the cover has been put in place the box is ready for use.

I claim as my invention—

1. A floor-box for electric conductors, comprising an outlet-box part adapted to be secured in place below the flooring, having a threaded rim, a sleeve adapted to screw into said rim, lugs on the interior of the sleeve, and contacts thereon, in combination with a plug, and means for securing the plug in position in the contact-carrying sleeve, substantially as described.

2. A floor-box for electric conductors in two parts, one an outlet-box part adapted to be secured in place in the floor, and the other a sleeve adapted to be secured to the box, lugs on the interior of the sleeve, and contacts thereon, in combination with a plug, and means for securing the plug in position in the contact-carrying part, substantially as described.

3. A floor-box for electric conductors, comprising an outlet-box part adapted to be secured in place below the flooring, a sleeve secured thereto, lugs projecting inwardly from the wall of said sleeve contacts carried by but insulated from said lugs, in combination with a plug carrying contacts adapted to connect with said first contacts and a cover, substantially as described.

4. A floor-box for electric conductors, comprising an outlet-box part for connection of the conduit-pipes and threaded at its upper part, a sleeve adjustably threaded onto the box part, insulated contacts carried by the sleeve, and a cover for the latter in combination with a plug to connect with said contacts.

5. A floor-box for electric conductors, comprising an outlet-box adapted to be secured below the flooring, a threaded upper rim thereto, a sleeve threaded at both ends and having inwardly-projecting lugs, and contact-plates on the lugs, the sleeve screwed to the box part, in combination with a plug having a tapered upper end and a cover with an opening tapered to correspond thereto, and adapted to be screwed into the upper end of said sleeve, substantially as described.

6. A floor-box for electric conductors, comprising a box adapted to be secured in the floor, having an externally-threaded upper rim, a sleeve internally threaded at both ends, one end fitting the rim of the box, lugs projecting inwardly within the sleeve, contact-blades insulated from and mounted on said lugs, in combination with a plug with contact-plates adapted to fit between said blades and having a tapered end, a cover for the sleeve having a threaded central opening through which the plug may be passed, the cover threaded into the sleeve, and an externally-threaded bushing to fit the central opening to hold the plug in place between the contact-blades.

7. A floor-box for electric conductors in two parts, one an outlet-box part, an opening in the wall thereof for the wires, a threaded rim to the box, a sleeve adapted to be screwed onto said rim, contacts carried on the interior of the sleeve to which the said wires are adapted to be attached after the sleeve is screwed in place, substantially as described.

8. A floor-box for electrical conductors, comprising an outlet-box part adapted to be secured to the conduits, a threaded outer rim therefor, a sleeve adapted to be screwed onto said rim, integral inwardly-projecting lugs on the sleeve and insulated contacts carried thereby, substantially as described.

In testimony whereof I have signed my name to this specification in the presence of two subscribing witnesses.

HUBERT KRANTZ.

Witnesses:
E. HOMAN,
J. A. NEWTON.